Oct. 31, 1933.  E. DENMAN  1,932,959
COMBINATION SEAT, TABLE, AND CANOPY STAND
Filed Jan. 30, 1933
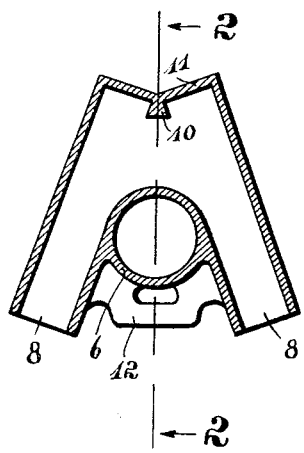
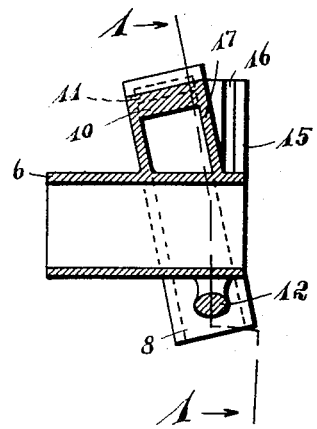
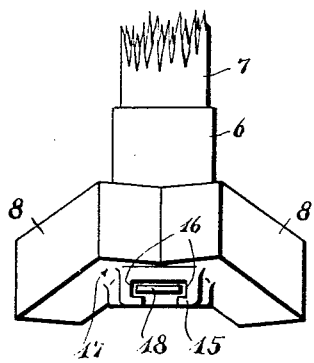
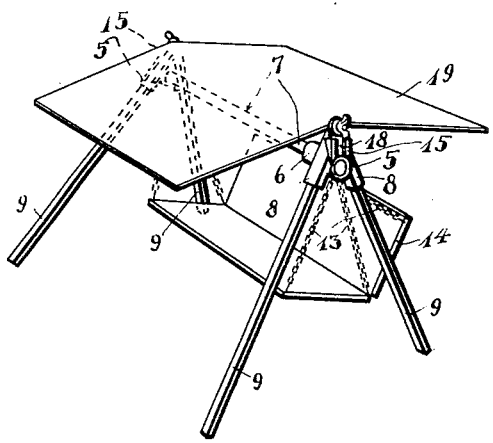
INVENTOR:
ELMER DENMAN,
By: Otto H. Ruger,
his Atty.

Patented Oct. 31, 1933

1,932,959

UNITED STATES PATENT OFFICE 1,932,959

COMBINATION SEAT, TABLE, AND CANOPY-STAND

Elmer Denman, Sacramento, Calif.

Application January 30, 1933. Serial No. 654,166

1 Claim. (Cl. 5—130)

This invention relates to a framework and its parts for supporting a swinging seat and table as well as a canopy.

One of the objects of this invention is to provide a bracket so designed that other parts can readily and quickly be inserted to form a rigid support for a seat or table and a canopy over the top without any screws or bolts in the bracket.

Another object is to provide a stand of strong and rigid form easily demountable.

Other objects will appear from the following description and appended claim as well as from the accompanying drawing, in which—

Fig. 1 is a vertical section through a stand-bracket on line 1—1 of Fig. 2.

Fig. 2 is a section through the bracket on line 2—2 of Fig. 1.

Fig. 3 is a top plan view of the bracket with a portion of a pole inserted therein.

Fig. 4 is a perspective view of the stand as assembled, to support a seat and a canopy over the top.

The principal part of the stand, by which the desired results can be accomplished, is clearly represented by the bracket illustrated in Figs. 1, 2, and 3.

One bracket of this form is provided for each end of the complete stand as indicated at 5 in Fig. 4.

Each bracket is so designed that other co-operating parts can easily be inserted into pockets, or sockets, or grooves, or other suitably formed portions of the bracket, thereby firmly engaging with such portions of the bracket, to form a rigidly joined whole structure when assembled.

A central, normally horizontally disposed, sleeve-portion 6 serves to engage over the end of the pole or bar 7, one bracket on each end of the bar 7 as stated above, and, since the brackets are not unduly projecting laterally in any direction from the sides of the bar 7, in practice it has been found advisable to securely fasten the brackets to the bar-ends, so that other parts of the stand are simply placed alongside of the bar 7 at convenient points with respect to projections from the bracket, when the whole stand is packed in its demounted state.

Each bracket is further provided with sockets 8, into which the legs 9 are simply inserted in the manner illustrated in Fig. 4, distinct socket-portions being formed in the lower end of the bracket for each individual leg, sidewise and below the sleeve 6, while, above the sleeve 6, these sockets join in a common cavity in the top-end of the bracket as illustrated in Fig. 1, separated only at the extreme top by the wedge-portion 10, formed in the top-wall 11 of the bracket, whereby advantageous additional bracing effect is imparted to the individual legs.

On the lower side of the sleeve 6 a loop-portion 12 is provided, as illustrated in Figs. 1 and 2, by which chains 13 or similar connecting means can be applied to the brackets of the stand for suspending a seat 14 between the legs of the stand in the manner illustrated in Fig. 4.

Lugs 15 with the oppositely facing grooves 16 are provided on the end side wall 17 of the brackets, to receive and hold the flat supporting plugs 18 or supporting members of a canopy 19.

Each bracket 5 is therefore provided with and embodies all the different parts required for receiving and holding the legs, bracing the legs and therewith the whole stand, connecting the opposite ends of the stand and bracing the stand endwise, supporting a seat, and supporting a canopy over the top of the stand, without any screws, or bolts, or adjusting means, to result, nevertheless, in a positively rigidly connected and braced stand by merely loosely inserted parts with respect to such brackets.

Having thus described my invention, I claim:

In a stand, a bracket made of an integral casting comprising a central sleeve portion, distinct socket-portions on opposite sides of the sleeve-portion with their open ends slanting and thereby spreading from the adjoining points next to the sleeve-portion outwardly, the socket-portions joining in a common cavity next to the sleeve-portion on the opposite side with respect to the spread open ends of the socket-portions, there being a wedge-portion projecting from the wall of the bracket into the cavity opposite to the sleeve portion, a loop-portion on the outside of the sleeve-portion forming a brace between the socket-portions extending beyond the sleeve-portions, and grooved lugs on the outside of the end-walls of the bracket and socket-portions projecting towards one side from the sleeve-portions.

ELMER DENMAN.